(12) United States Patent
Sow et al.

(10) Patent No.: US 9,256,838 B2
(45) Date of Patent: Feb. 9, 2016

(54) SCALABLE ONLINE HIERARCHICAL META-LEARNING

(71) Applicant: INTERNATIONAL BUSINESS MACHINES CORPORATION, Armonk, NY (US)

(72) Inventors: Daby M. Sow, Hawthorne, NY (US); Deepak S. Turaga, Hawthorne, NY (US); Yu Zhang, Los Angeles, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 412 days.

(21) Appl. No.: 13/840,763

(22) Filed: Mar. 15, 2013

(65) Prior Publication Data

US 2014/0279741 A1    Sep. 18, 2014

(51) Int. Cl.
G06N 99/00    (2010.01)
(52) U.S. Cl.
CPC .................................. G06N 99/005 (2013.01)
(58) Field of Classification Search
CPC .................................................. G06N 99/005
See application file for complete search history.

(56) References Cited

U.S. PATENT DOCUMENTS

| | | | |
|---|---|---|---|
| 7,480,640 B1 | 1/2009 | Elad et al. | |
| 7,904,397 B2 | 3/2011 | Fan et al. | |
| 2008/0154820 A1* | 6/2008 | Kirshenbaum et al. | 706/20 |
| 2009/0083332 A1 | 3/2009 | Datta et al. | |
| 2009/0182696 A1* | 7/2009 | Menahem et al. | 706/20 |
| 2013/0290223 A1* | 10/2013 | Chapelle et al. | 706/12 |

OTHER PUBLICATIONS

A Streaming Algorithm (SEA) for Large-Scale Classification, by Street, published 2001.*
Eigenvectors for combining correlated classifiers, by Ulas et al., published 2012.*
Alfredo Cuzzocrea, et al., "Analytics over Large-Scale Multidimensional Data: The Data Revolution", CIKM '11: Conf. on Info. and Know. Management, pp. 101-104, 2011.
Byung-Hoon Park, et al., "Distributed Data Mining: Algorithms, Systems and Applications", Distributed data mining handbook, pp. 341-358, 2002.
Mehmed Kantardzic, "Data Mining Concepts, Models, Methods and Algorithms", Wiley-IEEE Press, 2011.
Philip K. Chan, et al., "Experiments on Multistrategy Learning by Meta-Learning", CIKM '93: Proc. 2nd Int'l Conf. on Info. and Know. Management, 1993.
Sanjay Agrawal, et al., "Integrating Vertical and Horizontal Partitioning into Automated Physical Database Design", SIGMOD '04, ACM SIGMOD Int'l Conf. on Management of Data, pp. 359-370, 2004.
Keisuke Ishibashi, et al, "Detecting Mass-Mailing Worm Infected Hosts by Mining DNS Traffic Data", MineNet '05: ACM SIGCOMM Workshop on Mining Network Data, pp. 159-164, 2005.

(Continued)

*Primary Examiner* — Jeffrey A Gaffin
*Assistant Examiner* — Thomas Fink
(74) *Attorney, Agent, or Firm* — F. Chau & Associates, LLC

(57) ABSTRACT

A method of meta-learning includes receiving a prediction objective, extracting a plurality of subsets of data from a distributed dataset, generating a plurality of local predictions, wherein each local prediction is based on a different subset of the plurality of subsets of data and the prediction objective, combining the plurality of local predictions, and generating a final prediction based on the combined local predictions.

22 Claims, 6 Drawing Sheets

(56) References Cited

OTHER PUBLICATIONS

Martin Sewell, Ensemble Learning, UCL Research Note, 2007.
Ethem Alpaydin, "Introduction to machine learning", MIT Press, 2004.
Sabine McConnell, et al., "Building Predictors from Vertically Distributed Data", CASCON '04: Proc. 2004 Conf. of the Centre for Advanced Studies on Collaborative Research, 2004.
Aleksandar Lazarvec, et al., "Feature Bagging for Outlier Detection", KDD '05: Proc. 11th ACM SIGKDD Int'l Conf. on Know. Discovery in Data Mining, 2005.
Peter Buhlmann, et al., "Boosting with the L2-Loss: Regression and Classification", J. American Stat. Assoc., 98 (2003), pp. 324-339.
Aleksandar Lazarevic, et al., "The Distributed Boosting Algorithm", KDD '01: Proc. 7th ACM SIGKDD Int'l Conf on Know. Discovery in Data Mining, 2001.
Saharon Rosset, "Robust Boosting and its Relation to Bagging", KDD '05: Proc. 11th ACM SIGKDD Int'l Conf. on Know. Discovery in Data Mining, 2005.
Claudia Perlich, et al., "On Cross-Validation and Stacking: Building seemingly predictive models on random data", ACM SIGKDD Explorations Newsletter, 12 (2010), pp. 11-15.
David H. Wolpert, "Stacked Generalization", Neural Networks, 5 (1992), pp. 241-259.
Hillol Kargupta, et al., "Collective Data Mining: A New Perspective Toward Distributed Data Analysis", in Advances in Distributed and Parallel Know. Discovery, 1999.
Hillol Kargupta, et al., "Collective Data Mining From Distributed, Vertically Partitioned Feature Space", KDD '98: Workshop on Distributed Data Mining, 1998.
Gonzalo Mateos, et al., "Distributed Sparse Linear Regression", IEEE Transactions on Signal Processing, vol. 58, No. 10, Oct. 2010, pp. 5262-5276.
Haipeng Zheng et al., "Attribute-Distributed Learning: Models, Limits and Algorithms, " IEEE Transactions on Signal Processing, vol. 59, No. 1, Jan. 2011, pp. 386-398.
Yoav Freund, et al, "A decision-theoretic generalization of on-line learning and an application to boosting", Computational Learning Theory, 904 (1995), pp. 23-37.
Shai Shalev-Shwartz, et al., "Pegasos: Primal Estimated sub-GrArdient SOlver for SVM", ICML '07: Proceedings of the 24th Int'l Conf. on Machine Learning, Corvallis, OR, 2007.
Krzysztof Grabczewski et al., "Control of complex machines for meta-learning in computational intelligence", CIMMACS'07: Proceedings of the 6th WSEAS Int'l Conf. on Computational intelligence, man-machine systems and cybernetcs, pp. 286-292.
Andreas L. Prodromidis et al, "Meta-learning in distributed data mining systems: Issues and Approaches", Advances of Distributed Data Mining, 2000.

* cited by examiner

SCALABLE ONLINE HIERARCHICAL META-LEARNING

This invention was made with Government support under Contract No. H98230-11-C-0276 awarded by Department of Defense (DOD). The Government has certain rights in this invention.

BACKGROUND

1. Technical Field

Exemplary embodiments of the present invention relate to scalable online hierarchical meta-learning, and more particularly, to a system and method for implementing scalable online hierarchical meta-learning.

2. Discussion of Related Art

With the emergence of sensor technologies and the general instrumentation of the real world, big data analytics are being utilized more frequently to transform large datasets collected by sensors into actionable intelligence. In addition to having a large volume of information, large datasets may also be defined by their heterogeneity and distributed nature. Learners may be utilized to extract and analyze data from a large dataset. Existing distributed data mining techniques may be characterized by limited data access as the result of the application of local learners having limited access to a large and distributed dataset. The applications of such distributed data mining systems to real-world problems across different sites and by different institutions offer the promise of expanding current frontiers in knowledge acquisition and data-driven discovery within the bounds of data privacy constraints that prevent the centralization of all the data for mining purposes.

BRIEF SUMMARY

According to an exemplary embodiment of the present invention, a method of meta-learning includes receiving a prediction objective, extracting a plurality of subsets of data from a distributed dataset, generating a plurality of local predictions, by a plurality of local learners, wherein each local prediction is based on a different subset of the plurality of subsets of data and the prediction objective, combining the plurality of local predictions, by a plurality of meta-learners, and generating a final prediction, by an ensemble learner, based on the combined local predictions.

The method may further include partitioning the plurality of local learners into a plurality of correlated groups based on respective learning models of each of the plurality of local learners, wherein local learners having a high correlation with each other are partitioned into a same correlated group, and local learners having a low correlation with each other are partitioned into different correlated groups.

The method may further include training local learners in a same correlated group together, and training local learners in different correlated groups independently.

The plurality of local learners may be trained online using a single pass on training data used to train the plurality of local learners.

The method may further include updating the respective learning models of each of the plurality of local learners based on at least one training residual of other local learners in the same correlated group, wherein the training residual includes a subset of a learning model of a corresponding local learner.

The method may further include transmitting a corresponding training residual of each local learner to the ensemble learner, generating updated training data, by the ensemble learner, based on the transmitted training residuals, transmitting the updated training data to the plurality of local learners, and generating the final prediction, by the ensemble learner, based on the transmitted training residuals.

The method may further include generating a covariance matrix corresponding to a correlation between two local learners of the plurality of local learners, setting a covariance matrix threshold value, training the two local learners collaboratively upon determining that an absolute value of the covariance matrix is greater than or equal to the covariance matrix threshold value, and training the two local learners independently upon determining that the absolute value of the covariance matrix is less than the covariance matrix threshold value.

The method may further include generating a directed acyclic graph including the ensemble learner, the plurality of local learners, and the plurality of meta-learners, wherein the directed acyclic graph illustrates a hierarchical relationship between the ensemble learners, the plurality of local learners, and the plurality of meta-learners.

According to an exemplary embodiment of the present invention, a method of meta-learning includes receiving a prediction objective, extracting a plurality of subsets of data, by a plurality of local learners, from a distributed dataset, selecting a learning model, by an ensemble learner, for each local learner from among the plurality of local learners, updating the learning model of each local learner, by the plurality of local learners, based on at least one learning model of a correlated local learner, and generating a final prediction, by the ensemble learner, based on data output by each local learner from among the plurality of local learners and the prediction objective.

According to an exemplary embodiment of the present invention, a meta-learning system may include a plurality of local learners, wherein each local learner is configured to extract a different subset of data from a plurality of subsets of data, and generate a local prediction based on a corresponding subset of data and a prediction objective, a plurality of meta-learners, wherein each meta-learner is configured to combine at least two local predictions generated by the plurality of local learners, and an ensemble learner configured to generate a final prediction based on the combined at least two local predictions.

At least one meta-learner from among the plurality of meta-learners may be configured to combine the at least two local predictions with another local prediction generated by another meta-learner, and the ensemble learner may be configured to generate the final prediction based on the combined at least two local predictions and the another local prediction.

The plurality of local learners may be partitioned into a plurality of correlated groups based on respective learning models of each of the plurality of local learners, local learners having a high correlation with each other may be partitioned into a same correlated group, and local learners having a low correlation with each other are partitioned into different correlated groups.

The plurality of local learners may be trained online using a single pass on training data used to train the plurality of local learners.

BRIEF DESCRIPTION OF THE SEVERAL VIEWS OF THE DRAWINGS

The above and other features of the present invention will become more apparent by describing in detail exemplary embodiments thereof with reference to the accompanying drawings, in which.

DETAILED DESCRIPTION

Exemplary embodiments of the present invention now will be described more fully hereinafter with reference to the accompanying drawings. This invention, may however, be embodied in many different forms and should not be construed as limited to the embodiments set forth herein.

Exemplary embodiments of the present invention relate to a system and method for hierarchical online learning. In exemplary embodiments, end-to-end prediction performance and convergence rate may be improved by utilizing a set of hierarchically organized meta-learners that automatically combine predictions from different heterogeneous learners. Exemplary embodiments may be implemented in a variety of systems in which data may be obtained from various data sources and used to solve a prediction objection such as, for example, healthcare systems, information technology (IT) management systems, etc. For example, in an IT management system, exemplary embodiments of the present invention may be used to receive a task to be performed by a worker (e.g., receive a prediction objection), extract data from a plurality of distributed data sources, and generate a final prediction based on a plurality of local predictions, each of which is based on one (or some) of the plurality of distributed data sources.

Figure 1:
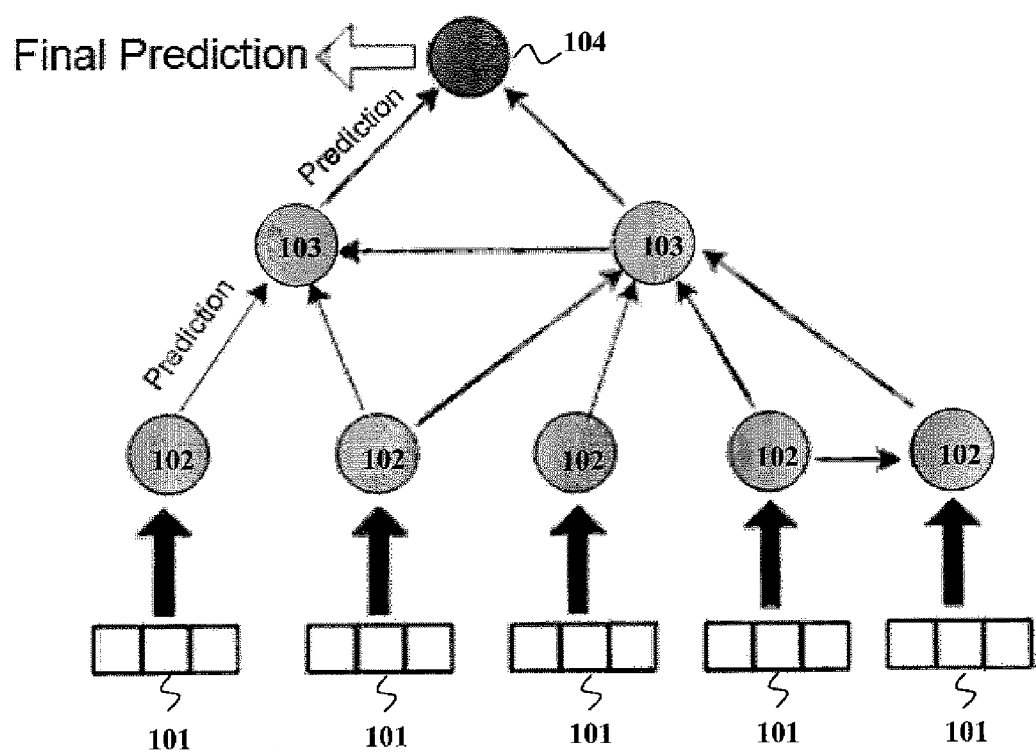
FIG. 1 shows a directed acyclic graph, according to an exemplary embodiment of the present invention.

FIG. 1 shows a directed acyclic graph, according to an exemplary embodiment of the present invention.

Distributed data mining techniques are utilized to mine data from distributed systems having voluminous amounts of data. In addition to the large size of the dataset in many distributed systems, the dataset may also have a high level of heterogeneity. According to exemplary embodiments of the present invention, a distributed data mining system includes a plurality of learners. The learners may include multiple local learners 102, multiple meta-learners 103, and an ensemble learner 104, as shown in FIG. 1. The meta-learners 103 may be disposed between the local learners 102 and the ensemble learner 104. The local learners 102 have access to subsets of the main dataset 101 at the lowest level of the hierarchy. Outputs from the local learners 102 (e.g., local predictions) may be transmitted to the ensemble learner 104, and the ensemble learner 104 may combine these outputs (e.g., the local predictions) to generate a single output (e.g., a final prediction).

Each meta-learner 103 may maintain a linear local model on all data and predictions it consumes. This linear local model is used by each meta-learner 103 to generate its prediction (e.g., the local predictions). For example, referring to FIG. 1, predictions flow upward from the local learners 102, to the meta-learners 103, to the ensemble learner 104. That is, the information exchange involving local predictions flows upward and is used to generate a final prediction.

Figure 2:
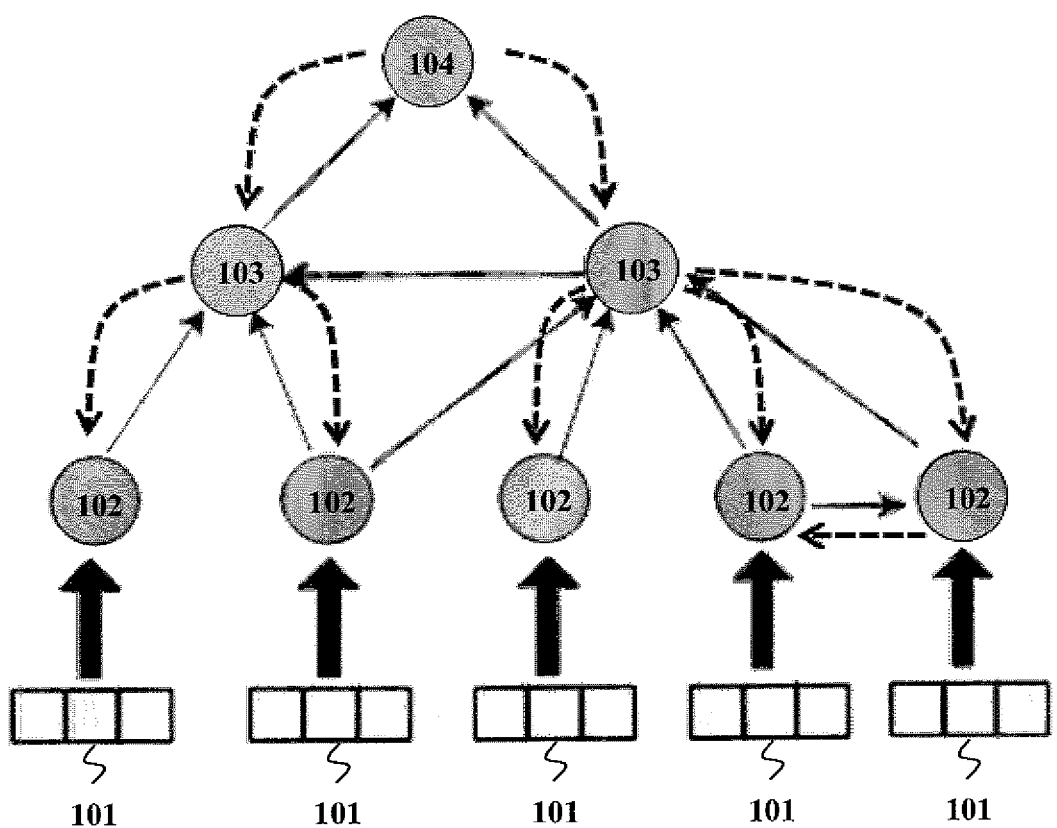
FIG. 2 shows the direction of exchanged information between learners in the directed acyclic graph of FIG. 1, according to an exemplary embodiment of the present invention.

FIG. 2 shows the direction of exchanged information between learners in the directed acyclic graph of FIG. 1, according to an exemplary embodiment of the present invention. The learners exchange information to coordinate their training processes and cooperatively optimize the performance of the system (e.g., the final output generated by the ensemble learner 104). For example, in FIG. 2, the solid arrows represent predictions flowing upward from the local learners 102 to the ensemble learner 104. As predictions are received at the ensemble learner 104, each learner updates its own model incrementally locally, as represented by the dashed arrows in FIG. 2. That is, the local updates start at the ensemble learner 104, and flow downward toward the local learners 102 (e.g., the information exchange involving learning model updates flows downward).

Online learning is used to train the local learners 102. For example, learning models on different learners are trained in an online fashion, requiring only a single pass to be used on the training data. In an exemplary embodiment, multiple passes may also be used on the training data. Utilization of online learning allows the distributed data mining system to efficiently handle large rates of non-stationary data, and allows for real-time stream mining.

Local learners 102 may be partitioned into correlated groups. This partitioning may be performed by estimating the cross-correlations of the learning models between different local learners 102. For example, local learners 102 within the same group have high correlations, and may be coordinated with each other in their training. In contrast, local learners 102 from different groups have low correlations, and are trained independently from each other. Partitioning local learners 102 into correlated groups allows for the computation complexity and communication overhead that is incurred by local learners 102 to be controlled, for example, by adjusting cross-correlation thresholds used to group local learners 102. As a result, exemplary embodiments of the present invention may support a wide spectrum of distributed learning scenarios, ranging from completely non-cooperative distributed learning where each local learner 102 defines its own partition, to fully cooperative distributed learning where all of the local learners 102 fully cooperate with each other.

Local learners 102 may share only their training residuals, as opposed to their entire learning models. Training residuals refer to the unexplainable portion of the local learners' 102 predictions. As a result, the amount of information exchange in the data mining system is decreased, and the data mining system is not dependent on the individual learning methods deployed at each of the local learners 102. Further, when the local learners 102 are correlated into groups, each local learner 102 may update its learning model based on the training residuals of other correlated learners rather than all other learners. For example, each meta-learner 103 may estimate an empirical covariance matrix between its local child learners. Based on this information, each child learner may only be sent information about other correlated learners. Limiting updating to correlated learners may result in decreased communication overheads during the training process when a large number of learners are used.

Exemplary embodiments of the present invention may be utilized for large-scale distributed data mining. For example, consider a distributed data mining system that includes one ensemble learner 104 and K local learners 102 from the set $\mathcal{K} = \{1, \ldots, K\}$. Time is divided into discrete periods. In each period n, one data instance is entering the distributed system.

Each instance includes d features, and each feature is indexed with $i \in \{1, \ldots, d\}$. Thus, an instance may be formally represented as $x^n=[(x_i^n)_{i=1}^d, y^n]$, where $y \in \mathcal{Y}$ is a label for this instance. Herein, the superscript n is used for variables to represent the time index.

For each incoming instance x, each local learner $k \in \mathcal{K}$ observes a subset of features $\mathcal{A}_k \subseteq (1, \ldots, d)$ such that every feature is used by at least one local learner 102. The subsets of features observed by different local learners 102 is not mutually exclusive. For example, any two local learners 102 may observe common features from an instance $x^n$ ($\mathcal{A}_{k1} \cap \mathcal{A}_{k2} \neq \phi$ for some k1 and k2$\in \mathcal{K}$).

As described above, learning may occur at both the ensemble learner 104 and at the local learners 102. At the ensemble learner 104, for each time period n, each local learner $k \in \mathcal{K}$ makes a local estimation $\hat{y}_k^n$ of the label $y^n$ for the observable portion $(x_j^n)_{j \in \mathcal{A}_k}$ of an incoming instance $x^n$. Each local learner 102 then submits its training residual to the ensemble learner 104. The ensemble learner 104 gathers the training residuals from the different local learners 102, forms a new training set, and generates a final ensemble prediction for this instance $x^n$. Learning at the ensemble learner 104 is described in further detail below.

Each local learner k maintains a finite number of prediction functions defined as $$\mathcal{F}_k = \left\{ f : \prod_{j \in \mathcal{A}_k} x_j \to \mathbb{R} \right\},$$

where $x_j$ denotes the range of feature $x_j$. Each prediction function may be interpreted as a trained classifier that may be utilized. Each local learner 102 may select an arbitrary rule for its prediction function in the ensemble learning process. Further, each local learner 102 may combine its available prediction functions using a linear regressor. For example, when $f_k = \{f_{k1}, \ldots, f_{k|F_k|}\}$ represents all prediction functions for a local learner k, the local learner k maintains a weight vector $b_k \in \mathbb{R}^{|F_k|}$ and its local prediction at period n is generated by $\hat{y}_k^n = \langle b_k, f_k((x_j^n)_{j \in \mathcal{A}_k}) \rangle$. The ensemble learner 104 then aggregates the local estimations from all of the local learners 102, and uses a linear regressor as its prediction function, generating the final output as $$\hat{y}_k = \sum_{k \in K} w_k \hat{y}_k^n,$$

where $w = \{w_k\}_{k=1}^K$ is the vector of weights assigned to local learners 102. In an exemplary embodiment, the prediction of each local learner 102 is unbiased. As a result, the sum of all weights is normalized to 1:

$$\sum_{k=1}^K w_k = 1.$$

The ensemble learning model may be represented by a vector $(\{b_k\}_{k=1}^K, w)$.

The learning models that are determined may minimize or reduce the expected mean-square error on the predictions over instances, under regularization constraints of the weight vectors of the ensemble learner 104 and the local learners 102. This minimization or reduction may be expressed as:

$$\min_{\{b_k\}_{k=1}^K, w} \mathbb{E}\left( y - \sum_{k=1}^K w_k \langle b_k, f_k((x_j)_{j \in A_k}) \rangle \right)^2,$$

s.t. $\|w\|_1 = 1$, $\|b_k\|_2 \leq \lambda_k, \forall k \in \mathcal{K}.$

A finite number of instances may exist at any period n. As a result, the minimization problem can be transformed into a minimization of the empirical mean-square error over instance 1 to n:

$$\min_{\{b_k\}_{k=1}^K, w} \sum_{m=1}^n \left( y^m - \sum_{k=1}^K w_k \langle b_k, f_k((x_j^m)_{j \in A_k}) \rangle \right)^2,$$

s.t. $\|w\|_1 = 1$, $\|b_k\|_2 \leq \lambda_k, \forall k \in \mathcal{K}.$

This minimization may further be expressed in a two-stage regression problem as:

$$\min_{\{b_k\}_{k=1}^K} \min_w \sum_{m=1}^n \left( y^m - \sum_{k=1}^K w_k \langle b_k, f_k((x_j^m)_{j \in A_k}) \rangle \right)^2,$$

s.t. $\|w\|_1 = 1$, $\|b_k\|_2 \leq \lambda_k, \forall k \in \mathcal{K}.$

To solve this two-stage regression problem, the weight vector w at the ensemble learner 104 and the learning model $b_k$ at each local learner may be updated, for example, in an online manner.

Regarding learning at the ensemble level, the update of w at the ensemble learner 104, when $(b_k)_{k=1}^K$ is fixed, can be regarded as a regression problem over w. The ensemble learner 104 may update w by solving the solution of the following problem:

$$\min_w \|y^n - G^n w\|_2^2, \text{ s.t. } \|w\|_1 = 1.$$

In the above equation, $y = (y^1, y^2, \ldots, y^n)$, and $G^n \in \mathbb{R}^{n \times K}$ is the history of local estimations from local learners with $[G^n]_{mk} = \hat{y}_k^m, \forall m \leq n$. The above equation may be solved using an Ordinary Least Square (OLS) estimator. For example, $$w^n = \frac{((C^n)^T C^n)^{-1} \mathbf{1}}{\mathbf{1}^T ((C^n)^T C^n)^{-1} \mathbf{1}},$$

with the minimum (empirical) ensemble training residual being:

$$r(C^n) = \frac{1}{1^T((C^n)^T C^n)^{-1} 1}.$$

The matrix $C^n \in R^{m \times K}$ stores the training residuals of the local learners with $[C^n]_{mk} = y^m - \hat{y}_k^m$, $\forall m \le n$. Thus, $(C^n)^T C^n$ may be interpreted as the empirical covariance matrix between local learners. Since storing $(C^n)^T C^n$ and computing its inverse in each time period may be computationally expensive, an exemplary embodiment of the present invention may utilize a stochastic gradient descent method to update w on-the-fly, without needing knowledge of the entire history of training residuals (e.g., the matrix $C^n$). For example, in an exemplary embodiment, rather than estimating the loss function in:

$$\min_w \|y^n - G^n w\|_2^2, \text{ s.t. } \|w\|_1 = 1,$$

the gradient may be estimated:

$$\nabla^n = 2(\langle w, g^n \rangle - y^n) g^n, \text{ where } g^n = \{g_k^n\}_{k=1}^K.$$

The process used for the update of w at the ensemble learner 104 in each period n may be illustrated as:

$$\nabla^n = 2(\langle w, g^n \rangle - y^n) g^n$$

$$w^{n+1} = \left(1 - \frac{1}{n}\right) w^n - \frac{1}{\alpha n} \nabla^n$$

Project $w^{n+1}$ to the $\ell_1$ ball $\|w\|_1 = 1$, where $\alpha$ specifies the learning rate. Further, with w being updated, $\{b_k\}_{k=1}^K$ is also updated to minimize the training residual, which is equivalent to maximizing its inverse:

$$\max_{C^n} 1^T ((C^n)^T C^n)^{-1} 1.$$

Referring to learning at the local learners, once the ensemble learner 104 has updated w, each of the local learners 102 exchanges training information with the ensemble learner 104. Each of the local learners 102 then uses the information received from the ensemble learner 104 to update its own weight maintained for its classifiers.

Figure 3:
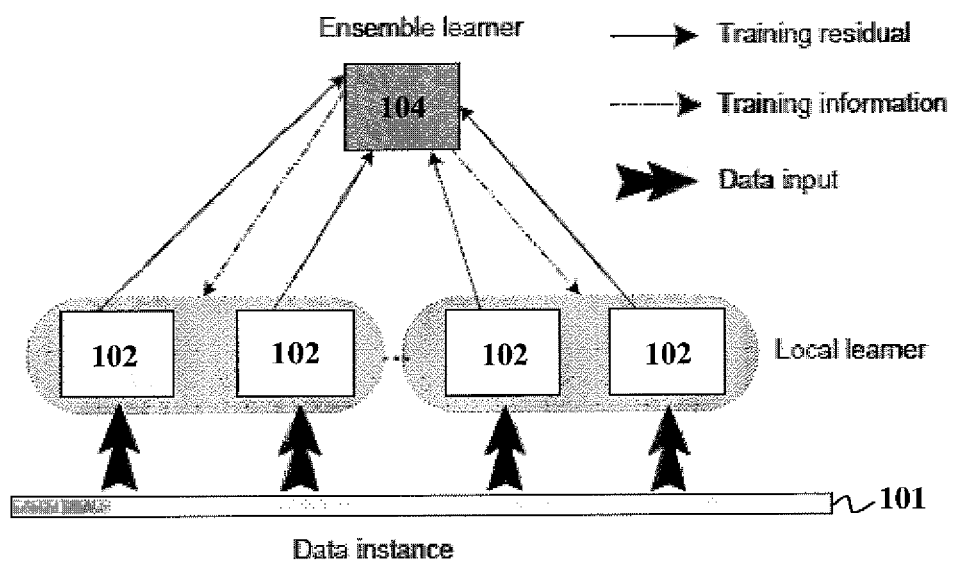
FIG. 3 shows an ensemble learning system that utilizes correlated training, according to an exemplary embodiment of the present invention.

FIG. 3 shows an ensemble learning system that utilizes correlated training, according to an exemplary embodiment of the present invention. In this system, the correlations between local learners 102 are used to partition the local learners 102 into multiple correlated groups. The local learners 102 within the same correlated group are trained cooperatively. Correlated training may result in an improved balance of prediction accuracy, communication cost, and computing complexity. Although FIG. 3 does not show any meta-learners 103 disposed between the local learners 102 and the ensemble learner 104, such meta-learners 103 may be present.

When correlated training is utilized, the covariance matrix $C^T C$, where each term $|[C^T C]_{k_1 k_2}|$ indicates a high correlation between the local learners $k_1$ and $k_2$, is analyzed. A large value of $|[C^T C]_{k_1 k_2}|$ indicates a high correlation between local learners $k_1$ and $k_2$. In this case, the local learners $k_1$ and $k_2$ are trained collaboratively. Alternatively, when $|[C^T C]_{k_1 k_2}|$ is close to zero, the local learners $k_1$ and $k_2$ are loosely correlated or independent of each other. In this case, the local learners $k_1$ and $k_2$ are trained independently. As a result, the communication overhead and speed of the convergence rate may be improved.

The ensemble learner 104 may determine the set of correlated local learners. This may be implemented in various ways. For example, in an exemplary embodiment, the ensemble learner 104 may set up a threshold value $\delta_k$, for each local learner k, and determine that a local learner l is correlated with the local learner k if and only if $|[C^T C]_{lk}| > \delta_k$. The value of $q_k$ (e.g., the number of local learners to include in the correlated set) may be varied.

Alternatively, the $q_k$ local learners having the highest correlations with the local learner k may be selected as its correlated set. The value of $q_k$ (e.g., the number of local learners to include in the correlated set) may be varied.

Figure 4:
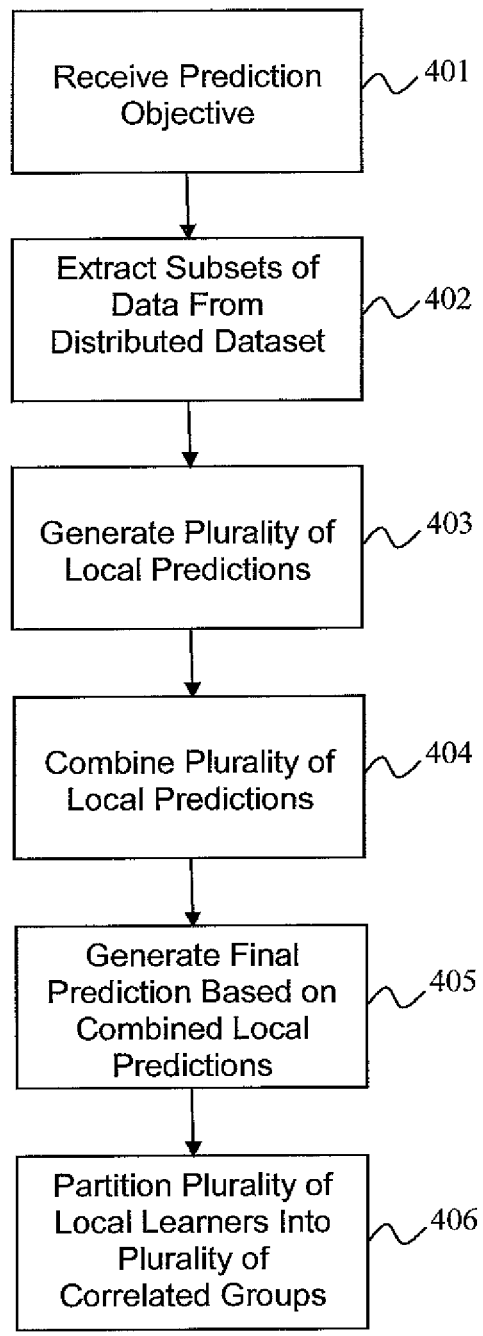
FIGS. 4 and 5 are flowcharts illustrating methods of meta-learning, according to exemplary embodiments of the present invention.

FIG. 4 is a flowchart illustrating a method of meta-learning, according to an exemplary embodiment of the present invention.

At block 401, a prediction objective is received. The prediction objective corresponds to a problem for which a solution is requested. At block 402, a plurality of subsets of data is extracted from a distributed dataset. Together, the plurality of datasets make up a global dataset. As described above, the plurality of datasets may have a high level of heterogeneity. At block 403, a plurality of local predictions are generated by a plurality of local learners 102. Each local prediction is based on a different subset of the plurality of subsets of data, as well as the prediction objective. At block 404, the plurality of local predictions are combined by a plurality of meta-learners 103. At block 405, a final prediction is generated by an ensemble learner 104 based on the combined local predictions. At block 406, the plurality of local learners 102 may be partitioned into a plurality of correlated groups. Partitioning may be based on the respective learning models of each of the plurality of local learners 102. For example, local learners 102 having a high correlation with each other may be partitioned into the same correlated group, and local learners 102 having a low correlation with each other may be partitioned into different correlated groups.

Figure 5:
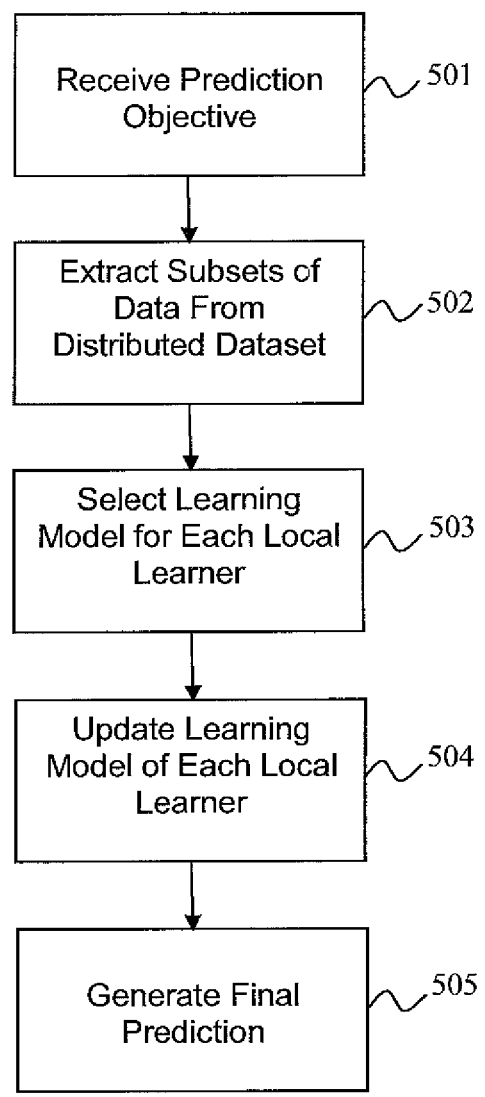

FIG. 5 is a flowchart illustrating a method of meta-learning, according to an exemplary embodiment of the present invention.

At block 501, a prediction objective is received. At block 502, a plurality of subsets of data are extracted from a distributed dataset. The subsets of data may be extracted by a plurality of local learners 102. At block 503, a learning model may be selected for each local learner 102 by an ensemble learner 104. At block 504, the learning model of each local learner 102 may be updated. The learning models may be updated by the respective local learners 102 based on at least one learning model of a correlated local learner 102 (e.g., as opposed to based on the learning model of all other local learners 102). At block 505, a final prediction may be generated by an ensemble learner 104. The final prediction may be based on data output by each local learner 102 (e.g., local predictions) and the prediction objective.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various exemplary embodiments of the present disclosure. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
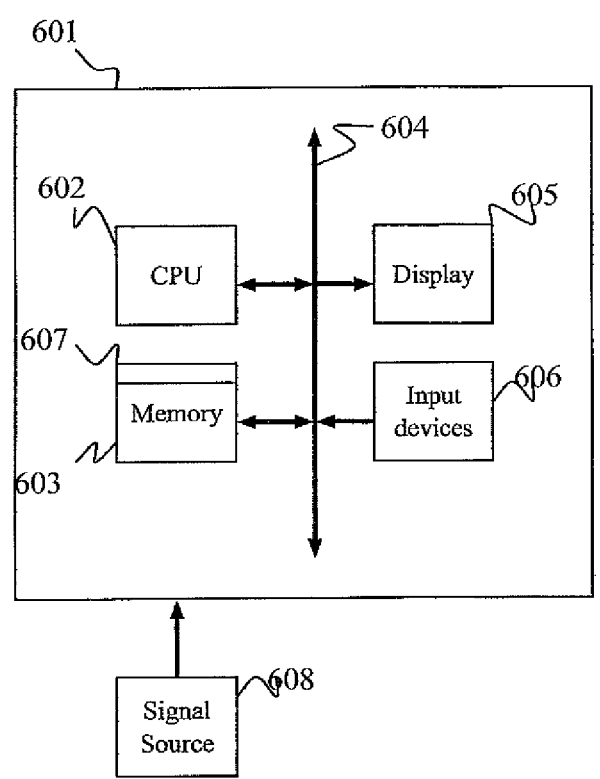
FIG. 6 illustrates a computer system for implementing scalable online hierarchical meta-learning, according to an exemplary embodiment of the present invention.

Referring to FIG. 6, according to an exemplary embodiment of the present invention, a computer system 601 for implementing scalable online hierarchical meta-learning can comprise, inter alia, a central processing unit (CPU) 602, a memory 603 and an input/output (I/O) interface 604. The computer system 601 is generally coupled through the I/O interface 604 to a display 605 and various input devices 606 such as a mouse and keyboard. The support circuits can include circuits such as cache, power supplies, clock circuits, and a communications bus. The memory 603 can include random access memory (RAM), read only memory (ROM), disk drive, tape drive, etc., or a combination thereof. The present invention can be implemented as a routine 607 that is stored in memory 603 and executed by the CPU 602 to process the signal from the signal source 608. As such, the computer system 601 is a general-purpose computer system that becomes a specific purpose computer system when executing the routine 607 of the present invention.

The computer platform 601 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

Having described exemplary embodiments for a system and method for scalable online hierarchical meta-learning, it is noted that modifications and variations can be made by persons skilled in the art in light of the above teachings. It is therefore to be understood that changes may be made in exemplary embodiments of the invention, which are within the scope and spirit of the invention as defined by the appended claims. Having thus described the invention with the details and particularity required by the patent laws, what is claimed and desired protected by Letters Patent is set forth in the appended claims.

What is claimed is:

1. A method of meta-learning, comprising:
receiving a prediction objective;
extracting a plurality of subsets of data from a distributed dataset;
generating a plurality of local predictions, by a plurality of local learners, wherein each local prediction is based on a different subset of the plurality of subsets of data and the prediction objective;
combining the plurality of local predictions, by a plurality of meta-learners;
generating a covariance matrix corresponding to a correlation between two local learners of the plurality of local learners;
setting a covariance matrix threshold value;
training the two local learners collaboratively upon determining that an absolute value of the covariance matrix is greater than or equal to the covariance matrix threshold value;
training the two local learners independently upon determining that the absolute value of the covariance matrix is less than the covariance matrix threshold value; and
generating a final prediction, by an ensemble learner, based on the combined local predictions.

2. The method of claim 1, further comprising:
partitioning the plurality of local learners into a plurality of correlated groups based on respective learning models of each of the plurality of local learners,
wherein local learners having a high correlation with each other are partitioned into a same correlated group, and local learners having a low correlation with each other are partitioned into different correlated groups.

3. The method of claim 2, further comprising:
training local learners in a same correlated group together; and
training local learners in different correlated groups independently.

4. The method of claim 3, wherein the plurality of local learners are trained online using a single pass on training data used to train the plurality of local learners.

5. The method of claim 3, further comprising:
updating the respective learning models of each of the plurality of local learners based on at least one training residual of other local learners in the same correlated group,
wherein the training residual comprises a subset of a learning model of a corresponding local learner.

6. The method of claim 5, further comprising:
transmitting a corresponding training residual of each local learner to the ensemble learner;
generating updated training data, by the ensemble learner, based on the transmitted training residuals;
transmitting the updated training data to the plurality of local learners; and
generating the final prediction, by the ensemble learner, based on the transmitted training residuals.

7. The method of claim 1, further comprising:
generating a directed acyclic graph comprising the ensemble learner, the plurality of local learners, and the plurality of meta-learners,
wherein the directed acyclic graph illustrates a hierarchical relationship between the ensemble learners, the plurality of local learners, and the plurality of meta-learners.

8. A method of meta-learning, comprising:
receiving a prediction objective;
extracting a plurality of subsets of data, by a plurality of local learners, from a distributed dataset;
selecting a learning model, by an ensemble learner, for each local learner from among the plurality of local learners;
updating the learning model of each local learner, by the plurality of local learners, based on at least one learning model of a correlated local learner;
generating a covariance matrix corresponding to a correlation between two local learners from among the plurality of local learners;
setting a covariance matrix threshold value;
training the two local learners collaboratively upon determining that an absolute value of the covariance matrix is greater than or equal to the covariance matrix threshold value;
training the two local learners independently upon determining that the absolute value of the covariance matrix is less than the covariance matrix threshold value; and
generating a final prediction, by the ensemble learner, based on data output by each local learner from among the plurality of local learners and the prediction objective.

9. The method of claim 8, further comprising:
partitioning the plurality of local learners into a plurality of correlated groups based on respective learning models of each of the plurality of local learners,
wherein local learners having a high correlation with each other are partitioned into a same correlated group, and local learners having a low correlation with each other are partitioned into different correlated groups.

10. The method of claim 9, further comprising:
training local learners in a same correlated group together; and
training local learners in different correlated groups independently.

11. The method of claim 10, wherein the plurality of local learners are trained online using a single pass on training data used to train the plurality of local learners.

12. The method of claim 10, further comprising:
updating the respective learning models of each of the plurality of local learners based on at least one training residual of other local learners in the same correlated group,
wherein the training residual comprises a subset of a learning model of a corresponding local learner.

13. The method of claim 12, further comprising:
transmitting a corresponding training residual of each local learner to the ensemble learner;
generating updated training data, by the ensemble learner, based on the transmitted training residuals;
transmitting the updated training data to the plurality of local learners; and
generating the final prediction, by the ensemble learner, based on the transmitted training residuals.

14. The method of claim 8, further comprising:
generating a directed acyclic graph comprising the ensemble learner, the plurality of local learners, and the plurality of meta-learners,
wherein the directed acyclic graph illustrates a hierarchical relationship between the ensemble learners, the plurality of local learners, and the plurality of meta-learners.

15. A computer readable storage medium embodying instructions executed by a processor to perform a method of meta-learning, comprising:
receiving a prediction objective;
extracting a plurality of subsets of data from a distributed dataset;
generating a plurality of local predictions, by a plurality of local learners, wherein each local prediction is based on a different subset of the plurality of subsets of data and the prediction objective;
combining the plurality of local predictions, by a plurality of meta-learners;
generating a covariance matrix corresponding to a correlation between two local learners of the plurality of local learners;
setting a covariance matrix threshold value;
training the two local learners collaboratively upon determining that an absolute value of the covariance matrix is greater than or equal to the covariance matrix threshold value;
training the two local learners independently upon determining that the absolute value of the covariance matrix is less than the covariance matrix threshold value; and
generating a final prediction, by an ensemble learner, based on the combined local predictions.

16. The computer readable storage medium of claim 15, further comprising instructions for:
partitioning the plurality of local learners into a plurality of correlated groups based on respective learning models of each of the plurality of local learners,
wherein local learners having a high correlation with each other are partitioned into a same correlated group, and local learners having a low correlation with each other are partitioned into different correlated groups.

17. The computer readable storage medium of claim 16, further comprising instructions for:
training local learners in a same correlated group together; and
training local learners in different correlated groups independently.

18. The computer readable storage medium of claim 17, further comprising instructions for:
updating the respective learning models of each of the plurality of local learners based on at least one training residual of other local learners in the same correlated group,
wherein the training residual comprises a subset of a learning model of a corresponding local learner.

19. A computer system configured to perform a method of meta-learning, comprising:
a memory storing a computer program; and
a processor configured to execute the computer program, wherein the computer program is configured to:
receive a prediction objective;
extract a plurality of subsets of data from a distributed dataset;
generate a plurality of local predictions, by a plurality of local learners, wherein each local prediction is based on a different subset of the plurality of subsets of data and the prediction objective;
combine the plurality of local predictions, by a plurality of meta-learners;
generate a covariance matrix corresponding to a correlation between two local learners of the plurality of local learners;
set a covariance matrix threshold value;
train the two local learners collaboratively upon determining that an absolute value of the covariance matrix is greater than or equal to the covariance matrix threshold value;
train the two local learners independently upon determining that the absolute value of the covariance matrix is less than the covariance matrix threshold value; and
generate a final prediction, by an ensemble learner, based on the combined local predictions.

20. The meta-learning system of claim 19, wherein the computer program is further configured to:
combine the two local predictions, by at least one meta-learner from among the plurality of meta-learners, with another local prediction generated by another meta-learner; and
generate the final prediction, by the ensemble learner, based on the combined local predictions and the another local prediction.

21. The meta-learning system of claim 19, wherein the computer program is further configured to:
partition the plurality of local learners into a plurality of correlated groups based on respective learning models of each of the plurality of local learners,
wherein local learners having a high correlation with each other are partitioned into a same correlated group, and local learners having a low correlation with each other are partitioned into different correlated groups.

22. The meta-learning system of claim 19, wherein the plurality of local learners are trained online using a single pass on training data used to train the plurality of local learners.

* * * * *